Nov. 1, 1938.                J. E. TRAINER                2,135,129
                        APPARATUS FOR ARC WELDING
                         Filed June 16, 1934            8 Sheets-Sheet 3
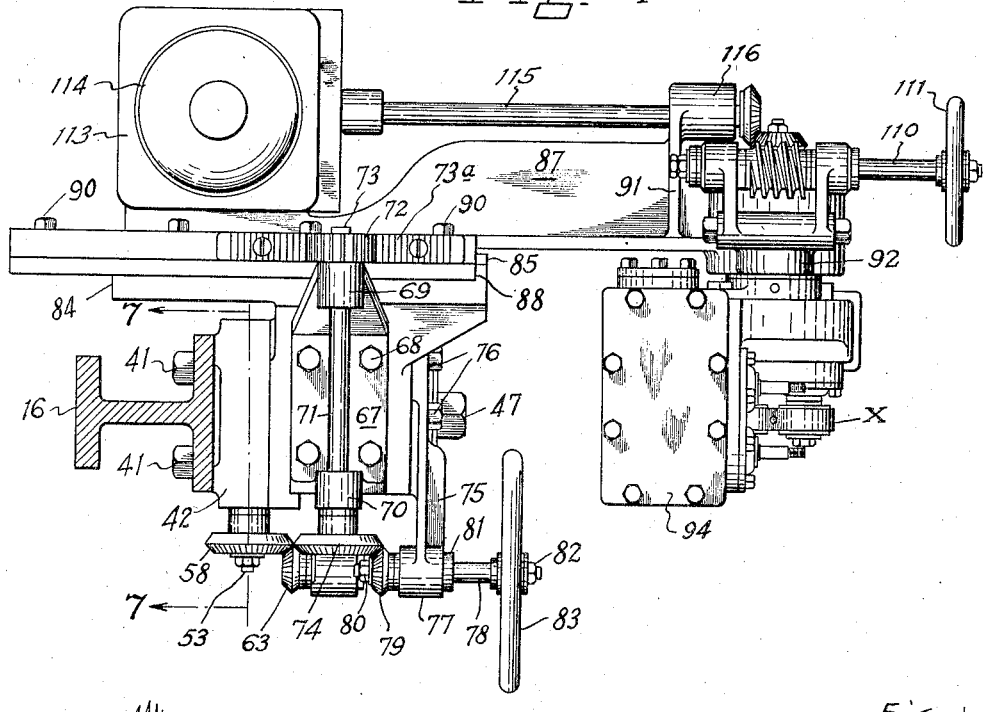
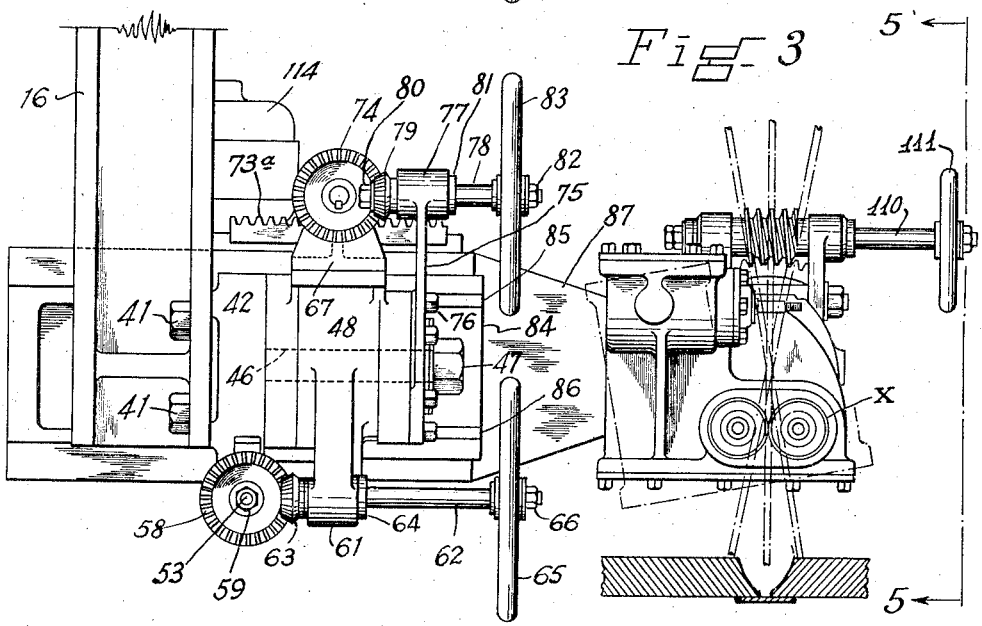
INVENTOR
James E. Trainer
BY
ATTORNEY

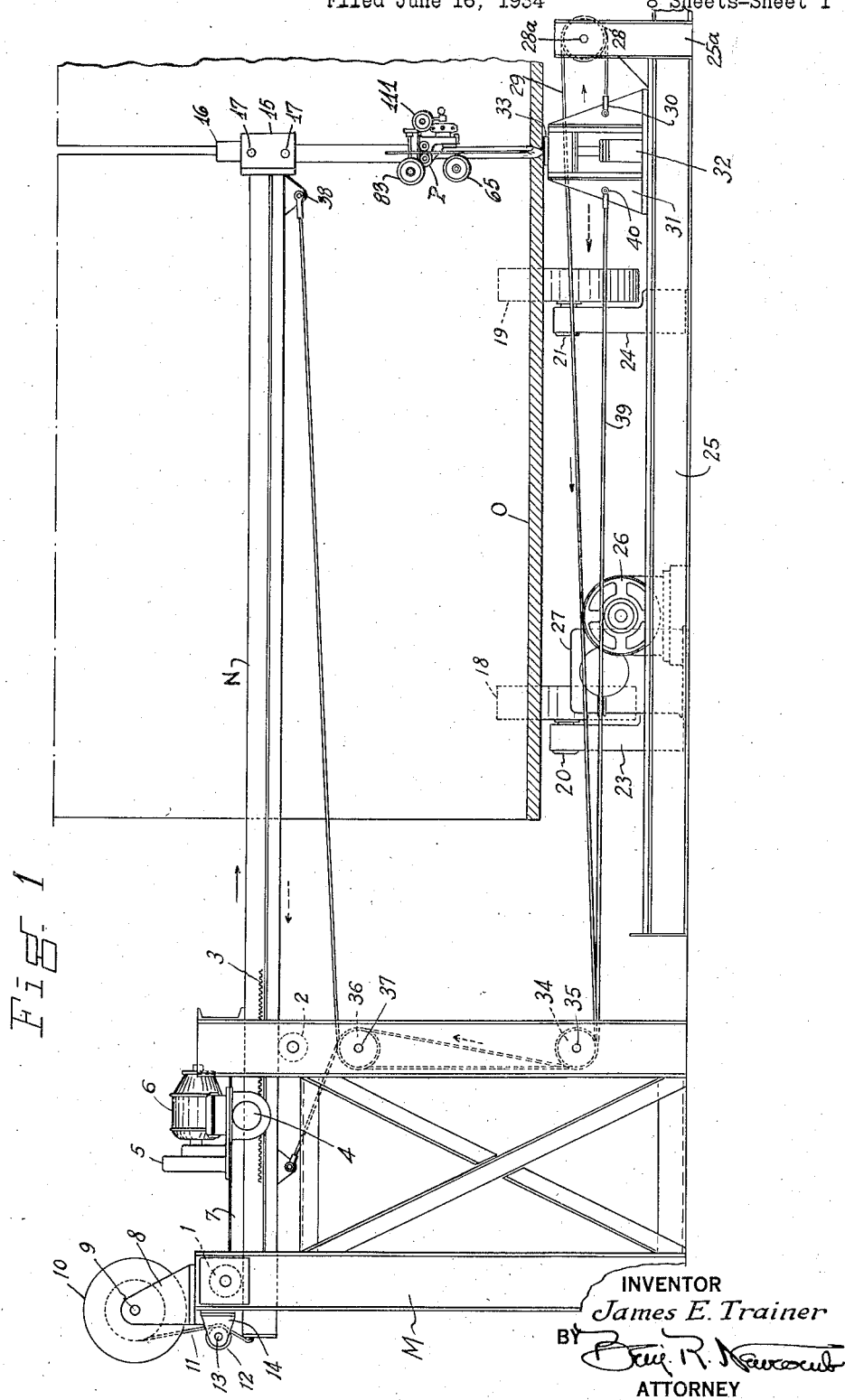

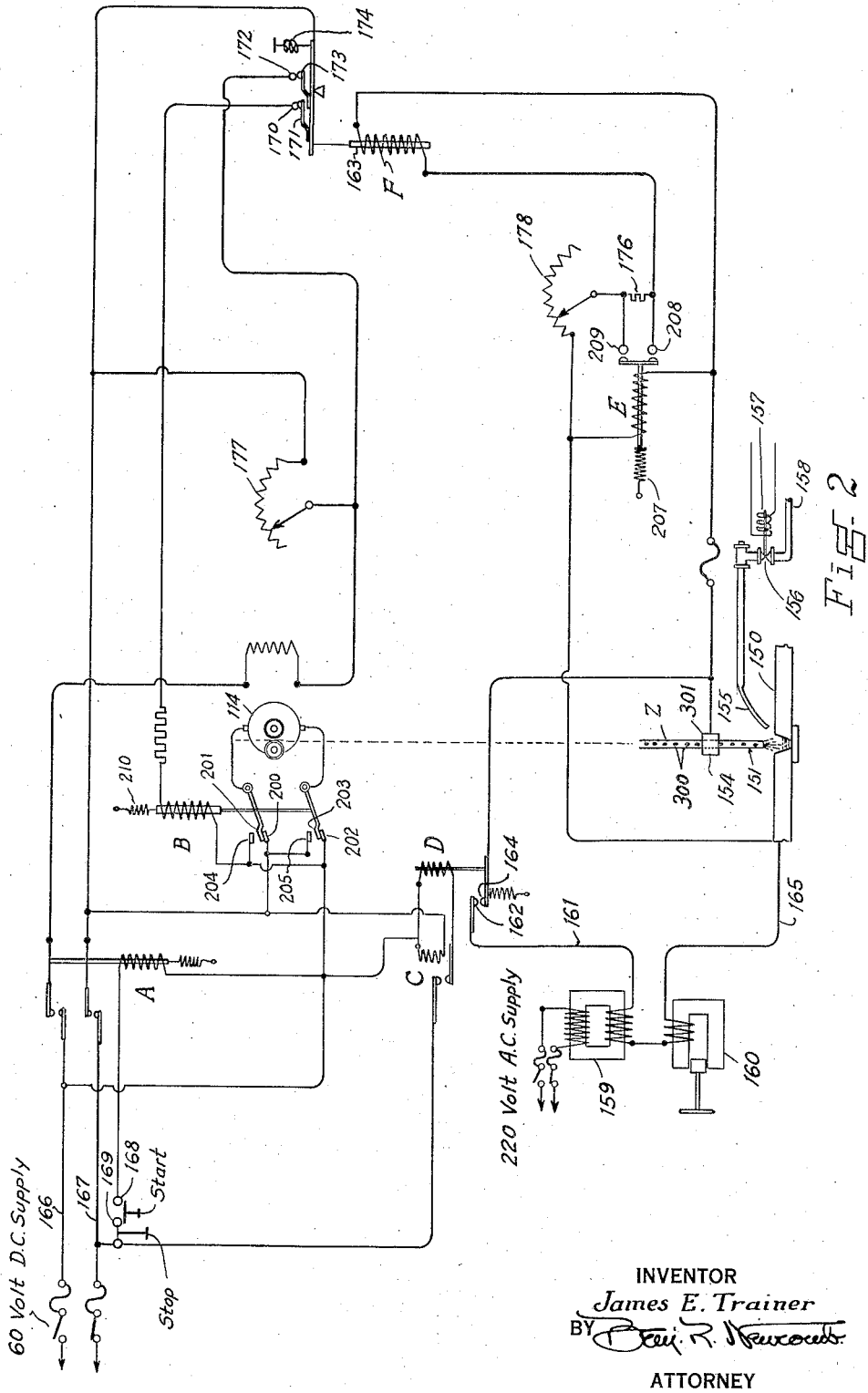

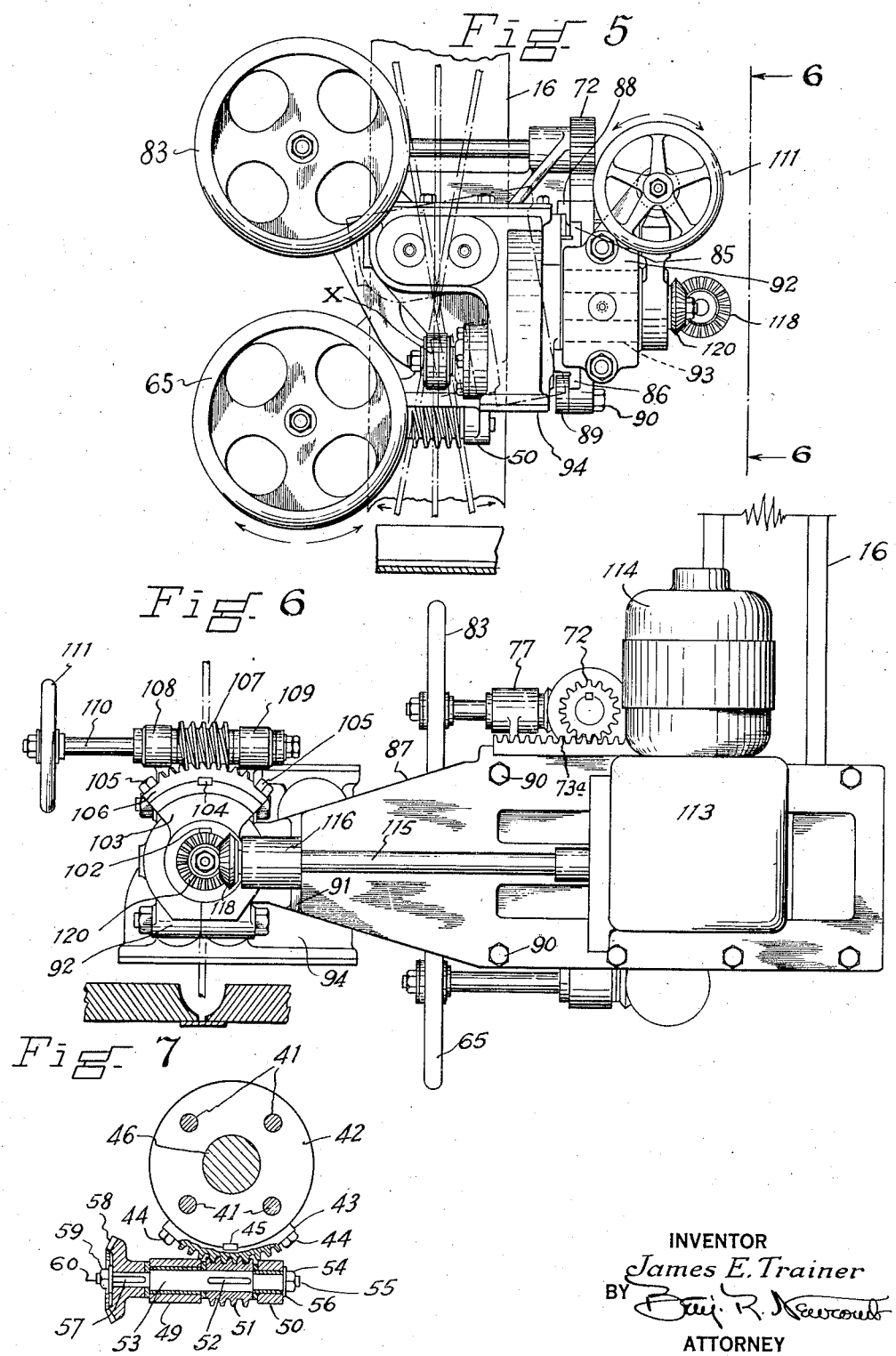

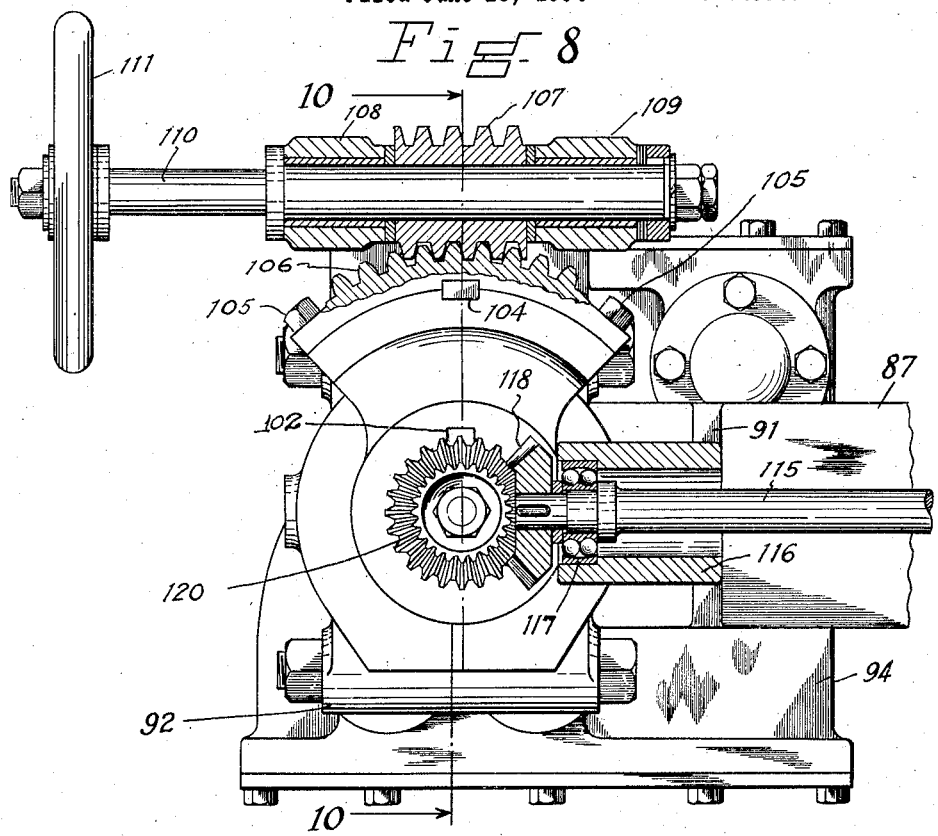
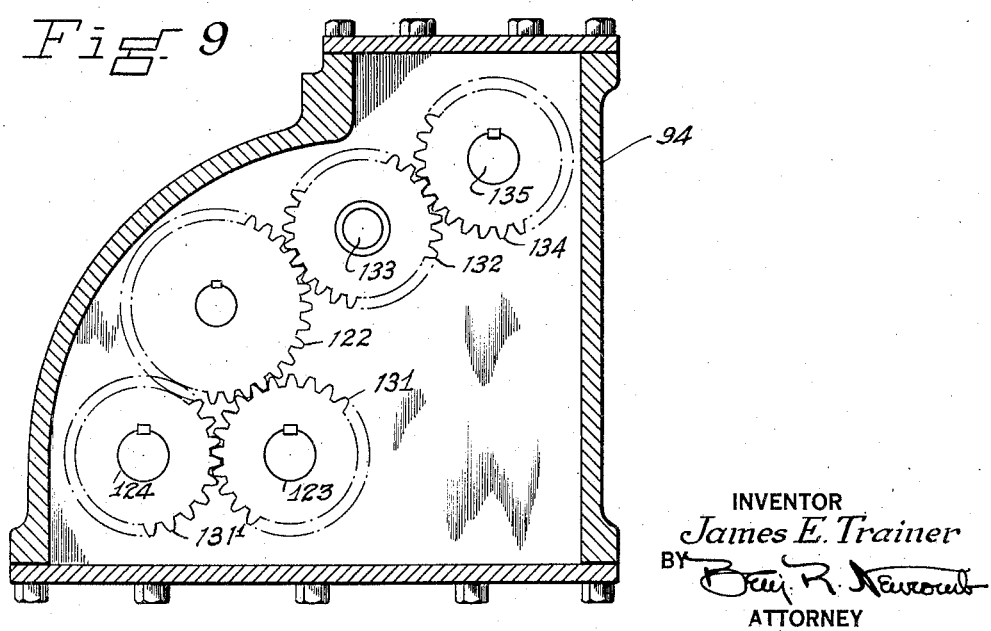

Nov. 1, 1938.   J. E. TRAINER   2,135,129
APPARATUS FOR ARC WELDING
Filed June 16, 1934   8 Sheets-Sheet 6
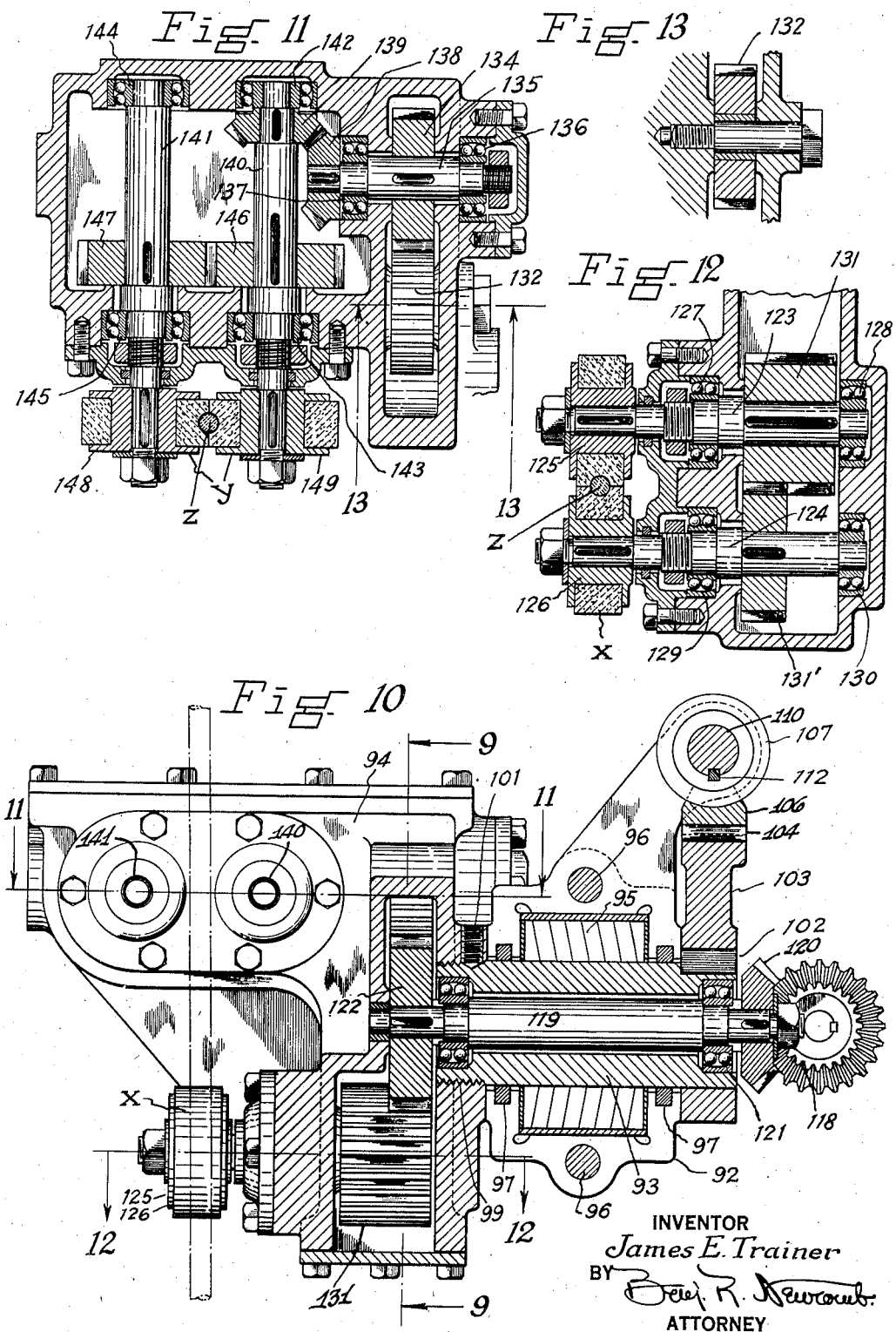

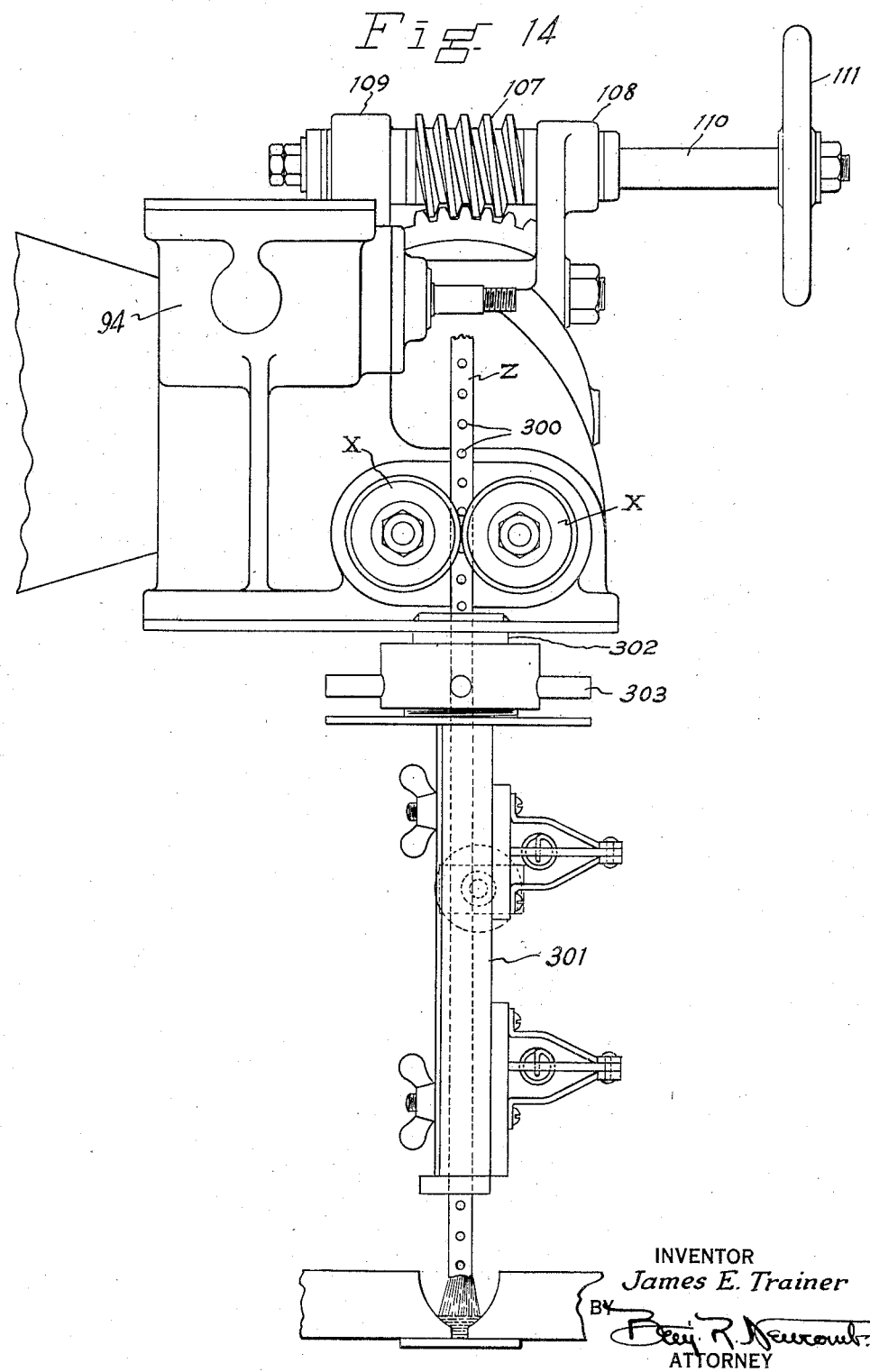

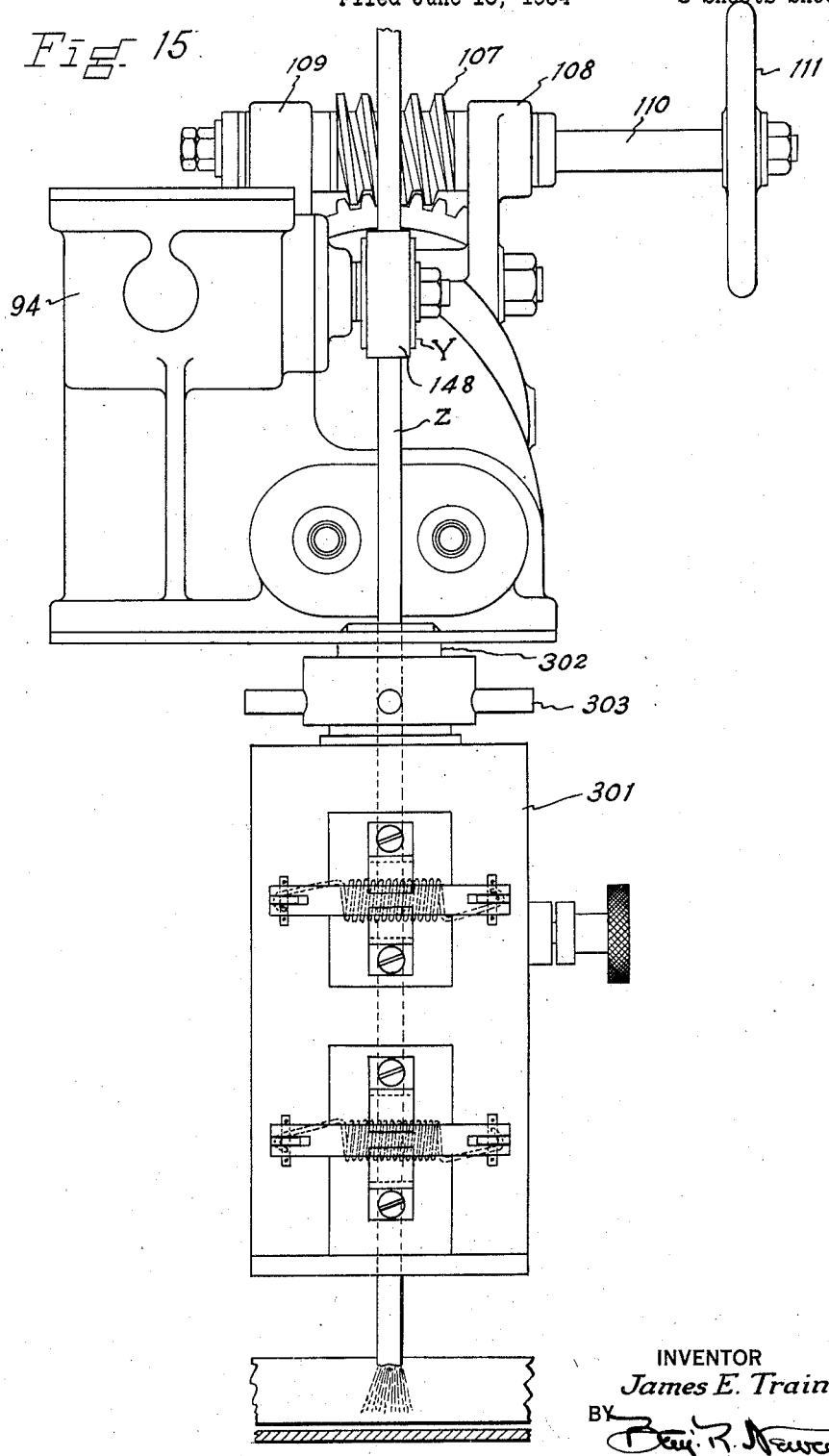

Patented Nov. 1, 1938

2,135,129

UNITED STATES PATENT OFFICE 2,135,129

APPARATUS FOR ARC WELDING

James E. Trainer, Akron, Ohio, assignor to The Babcock & Wilcox Company, Newark, N. J., a corporation of New Jersey Application June 16, 1934, Serial No. 730,852

2 Claims. (Cl. 219—8)

This invention relates to welding machines and more particularly to that class adapted to utilize the electric arc and in which a bare, coated or covered weldrod may be progressively fed to the weld.

An object of the invention is to provide a machine of the class mentioned so arranged that a weldrod feeding head is movable longitudinally of the work seam being welded, and yet is adapted for operation in a stationary position with the work seam movable relative thereto, whereby the same machine and weldrod feeding head may be utilized for either longitudinal or circumferential seam welding.

A further feature is the provision of a weldrod feeding head having an adjustment of the weldrod feeding device itself with relation to the same, in addition to the movement mentioned in the preceding paragraph and which thus renders it possible for the operator to exactly position the end of the weldrod with respect to the width dimensions of the seam.

The weldrod feeding head is also so constructed that the angularity of the rod with respect to the work seam may be adjusted in planes at right angles to each other to provide the proper weldrod inclination for the type of seam being worked upon, whether it be either a longitudinal, transverse or a circumferential seam.

Another important feature of the invention is the feeding of the weldrod with feeding rollers having a resiliently yielding frictional engagement with the weldrod and normally automatically operated for a rate of feed suitable for the type of work and materials used, but having a manual adjustment independent of the automatic feed, and a manual adjustment for varying and setting the rate of automatic feed, as well as an automatically actuated adjustment of the automatic feed varying the latter in accordance with conditions at the arc, or more broadly stated in accordance with conditions in the welding zone.

Additionally, the invention includes a welding current circuit and a welding current and weldrod feed control circuits, coordinated and cooperating for control of the conditions in the welding zone and providing a system which is especially adapted for the utilization of alternating current at the arc. The form of weldrod preferably used is that disclosed in my copending application for United States Letters Patent, Serial No. 637,234, filed October 11, 1932, since matured into Patent No. 2,057,861, dated Oct. 20, 1936.

If desirable, the machine, as used for circumferential and longitudinal welds on tank bodies, penstocks and the like, may include a backing-up member or a chill which is stationary for circumferential seams, while the work moves through a suitable work drive, but which may be moved longitudinally of the work seam coincidentally with the weldrod feeding head when the work being operated upon is, itself, stationary.

With the foregoing features stated the invention will now be described in connection with the accompanying drawings illustrating a practical form of the same and wherein:

Fig. 1 is a side elevation of the machine as adapted to the welding of a circumferential seam in a tank body, penstock unit or the like, with the elements being worked upon shown in section;

Fig. 2 is the electrical diagram for the coordinated and cooperating circuits;

Fig. 3 is an enlarged side elevation of my improved form of weldrod feeding head showing the latter as welding a longitudinal seam;

Fig. 4 is a top plan view of the weldrod feeding head shown in Fig. 3;

Fig. 5 is an end elevation in the direction of the arrows 5—5 of Fig. 3;

Fig. 6 is a side elevation of the weldrod feeding head as shown in Fig. 5 and in the direction of the arrows 6—6 of Fig. 5 or, in other words, this view is of the opposite side from that shown in Fig. 3;

Fig. 7 is a sectional view on the line 7—7 of Fig. 4;

Fig. 8 is an enlarged view, partly in section and in side elevation, of the angular adjustment for the weldrod in one plane, as also shown in Figs. 3 and 6;

Fig. 9 is a sectional view, in side elevation, of the gear box shown in Fig. 8;

Fig. 10 is a part sectional and elevational view in the direction of the arrows 10—10 shown in Fig. 8;

Fig. 11 is a sectional view on the line 11—11 of Fig. 10 showing the upper rollers in place and operatively engaging the weldrod, this arrangement being the one used for welding circumferential seams;

Fig. 12 is a sectional view on the line 12—12 of Fig. 10 and showing the lower rollers in place and operatively engaging the weldrod, this arrangement being the one used for welding longitudinal seams;

Fig. 13 is a sectional view on line 13—13 of Fig. 11;

Fig. 14 is a fragmentary enlarged side elevation of the weldrod feeding head with the weldrod shown in full and as being engaged by the lower set of rollers and including the contact shoes for conducting the welding current to the rod, this arrangement being the one used for welding longitudinal seams; and Fig. 15 is a view similar to Fig. 14 showing the alternative arrangement of the upper rollers engaging the rod for welding circumferential seams, and the electrical contact shoes turned at right angles to the position shown in Fig. 14.

In detail:

With reference to Fig. 1, an upright frame, suitably constructed, preferably from structural steel members, has guided therein, for longitudinal movement only, a horizontal beam N moving on the roller bearing members 1 and 2 carried by the frame M.

The horizontal beam N carries a longitudinally disposed rack 3 engaged by a pinion drive 4 driven through suitable reduction gearing 5 from the electric motor 6 mounted on base 7 stationary with the frame M.

For carrying electric current to the weldrod feeding head to be hereinafter described, brackets 8 on frame M support shaft 9 and the latter carries reel 10 on which is coiled the multiconductor cable 11 passing over the guiding idler roll 12 journaled on shaft 13 supported in brackets 14 also mounted on frame M; the conductor cable 11 is led along the beam N to the vertical guideway 15 at the end thereof and in which is the independent vertically adjustable column 16 held in position by locking screws 17.

The work to be operated upon is indicated at O as a cylindrical member in Fig. 1, and rests upon longitudinally spaced pairs of rollers 18 and 19 (only one of each pair being shown) suitably journaled as indicated at 20 and 21, respectively, upon stanchions 23 and 24 which are adjustable along a bed member 25; a motor 26, through appropriate reduction gearing 27 may drive one or more rollers of the pairs of rollers 18 or 19 for the purpose of moving the work past the weldrod when a circumferential weld is being accomplished, the movement of beam N taking care of longitudinal welds.

Centrally of the transverse dimension of the bed 25 is an upright 25ᵃ carrying a shaft 28ᵃ on which is journaled an idler 28. A cable 29 passes over the idler 28 and one end 30 of the cable is connected to a longitudinally sliding backing-up member 31 having an adjusting jack 32 engaging a weld seam backing-up strip 33 to assist in supporting the same against the weld seam boundaries; the other end of the cable 29 is passed under one of a group of idlers 34 journaled on shaft 35 and mounted in frame M, thence over one of a group of idlers 36 journaled on shaft 37 mounted in frame M and attached, as at 38, to the forward portion of beam N; similarly, one end of cable 39 is attached, as at 40, to the opposite side of backing-up member 31 from the attachment of cable 29 and passes under its idler section 34, thence over its particular idler section 36 and is secured to the after end of beam N.

With the arrangement described in the foregoing paragraph it will be observed that movement of beam N effects a corresponding movement of backing-up member 31, and thus the weldrod and backing-up member are always automatically maintained in proper relative position for cooperation, either for a longitudinal, circumferential or transverse seam.

The weldrod feeding head is generally indicated in Fig. 1 by the letter P and is mounted at the lower end of the upright column 16 carried by the front end of beam N to which it is secured by suitable studs or bolts 41 passing through the column 16 and entering the bracket 42 which has secured thereto a sector piece 43 held against displacement by bolts or studs 44 and key 45.

I refer now to Figs. 3, 4, 5, 6, 7, 8, 9, 10, 12 and 14 which show the details of my improved form of adjustable head, and the adjustment used for welding longitudinal seams.

A journal pin 46 is integral with or secured to the bracket 42 and extends outwardly therefrom at right angles, and is provided with a threaded member, such as either a stud or nut 47, at its outer end for purposes of retaining the elements hereinafter described in their assembled relation with respect to journal pin 46 and bracket 42.

Mounted upon journal pin 46 is the movable frame 48, the lower portion of which is provided with bearings 49 and 50 (see Fig. 7), with bushings as shown, and between which is received the worm gear 51 meshing with the teeth of sector 43; the worm gear 51 is secured by a key 52 to the shaft 53 turning in the bushings of bearings 49 and 50, the shaft 53 being held at one end against longitudinal displacement by the nut 54 and washer 56 on the threaded extension 55, while the other end has keyed thereto, as at 57, the bevel gear 58 secured in place by the nut 59 on the threaded extension 60 of said shaft 53.

The frame 48 of the weldrod feeding head also has integral therewith a bracket bearing 61 which journals shaft 62 secured against longitudinal movement by the bevel gear 63 fixed thereto and engaging bevel gear 58 and by collar 64; on the end of shaft 62 opposite bevel gear 63 is a handwheel 65 held by a key (not shown) and nut 66.

It will be obvious from the foregoing description relative to the mounting of the weldrod feeding head frame 48 on the journal pin 46 that movement of the handwheel 65 will displace the said frame 48 angularly by reason of the meshing bevel gears 58 and 63 which rotate shaft 53 and its worm 51, which latter engages the fixed sector 43; the object of such angular displacement of the welding head frame is to vary the angularity of the weldrod in one vertical plane, as will appear as this description proceeds.

On the top of the weldrod feeding head frame 48 is a bracket 67 secured by bolts 68 and having bearings 69 and 70 receiving the shaft 71 which, at one end, has keyed thereto a pinion 72 secured by nut 73 and engaging a rack 73ᵃ carried by frame 87, and at the other end bevel gear 74 is keyed and secured to the said shaft 71 (see Fig. 4). A bracket 75 held to the frame 48 by bolts 76 carries a bearing 77 journaling a shaft 78 having keyed and secured thereto a bevel gear 79 meshing with bevel gear 74 on shaft 71, end play of shaft 78 being prevented by nut 80 and collar 81; said shaft 78 has a handwheel 83 secured thereto and held thereon by a nut 82.

In an upright plane at the side of frame 48 is the guide member 84 fixed with respect to the said frame 48 and having laterally extending parallel guide surfaces 85 and 86 upon which the movable mounted member 87 slides, the elements 88 and 89 being secured to member 87 and overlapping guide surfaces 85 and 86 as shown in Fig. 5 and held in place by bolts or studs 90.

It will thus be evident that with the mounting above described, and the pinion and rack arrangement as set forth, motion of the handwheel 83 will move the weldrod feed and adjusting mechanism lineally.

Thus far there are three movements described, firstly, the movement of the entire welding head P through travel of the beam N, secondly, the angling movement of the weldrod feed and adjusting mechanism in the plane of movement of the entire welding head, this being accomplished by the handwheel 65; and thirdly, movement of the weldrod feed and adjusting mechanism lineally in a plane transverse to the movement accomplished by travel of beam N, but such movement by handwheel 83 is purely local for adjusting purposes with respect to the welding groove.

The weldrod feed and adjusting mechanism has also another movement and that is angular movement in a plane of movement coinciding with the plane of movement by handwheel 83.

The movably mounted member 87 is formed at its outer end 91 so that it provides a transverse journal bearing 92, as shown in Figs. 5, 6, 8 and 10 and which receives the pintle 93 of the gear housing 94 for the gears driving the weldrod feeding rollers arranged in pairs X and Y at right angles to each other, the pair X being shown in Figs. 3, 4, 5, 10, 12 and 14 and for the purpose of feeding the weldrod while welding a longitudinal seam, and the pair Y being shown in Figs. 1, 11, and 15 and being for the purpose of feeding the weldrod while welding a circumferential seam.

The cap of the journal bearing 92 is recessed, as is also the outer end 91 of member 87 to accommodate a roller or frictionless bearing 95 and the whole is held in assembled relation by bolts or studs 96, felt or other grease retaining rings 97 being located on each side of said bearing 95.

Extending through the bearing 95 is pintle 93 in the form of a sleeve threaded at one end into a gear casing 94 as shown at 99, said casing supporting and carrying the pair of weldrod feeding rollers X and Y above mentioned. The sleeve 93 is prevented from working out by the set screw 101. At the end opposite the threaded portion 99 of the sleeve 93 is keyed, as at 102, the sector member 103 which also has keyed and bolted thereto as at 104 and 105, respectively, the rack 106. The rack 106 is engaged by a worm 107 confined between bearings 108 and 109 of the member 87 which mount spindle 110 of handwheel 111 and to which spindle worm 107 is keyed, as at 112, so that motion of the handwheel 111 serves to tilt or angle gear case 94 and with it the electrode or weldrod.

Mounted at the side of member 87 is a reduction gear housing 113 surmounted by a vertically positioned electric driving motor 114 which is reversible and drives the horizontal shaft 115 through the medium of the reducing gear in housing 113 and which may be of any usual commercial type of the proper ratio and affording a right angle drive.

The outer end of shaft 115 passes through bearing support 116 carrying the ball bearing 117 and has keyed thereto the bevel pinion 118 meshing with a similar bevel pinion 120 keyed to stub shaft 119 and held thereon by a nut, said stub shaft 119 passing through ball bearings 121 in the sleeve 93 and the end opposite bevel pinion 118 carries a spur gear 122 keyed thereto and which by a system of spur gears to be hereinafter described, serves to drive the pairs of electrode or weldrod feeding rollers X and Y.

As stated, in case it is desired to weld a longitudinal seam the pair of rollers X is used. The pair of feed rollers X are mounted on stub shafts 123 and 124 which, respectively, carry feed rollers 125 and 126 of the pair X keyed thereto as shown, the rollers each having a resilient weldrod engaging face such, for instance, as rubber. Shafts 123 and 124 are mounted in ball bearings 127, 128 and 129, 130, as shown, and spur gears 131 and 131' are keyed to the shafts 123 and 124 and intermesh. The spur gear 131 has a double width face and meshes with spur gear 122 so that as shaft 115 is rotated by electric motor 114 the pair of weldrod feeding rollers X rotate to positively feed the electrode or weldrod gripped therebetween and indicated by the letter Z.

Also spur gear 122 engages idler spur gear 132 mounted on stub 133 and which, in turn, meshes with spur gear 134 keyed, as shown, to shaft 135; shaft 135 is mounted on ball bearings 136 and 137 and carries bevel gear pinion 138 meshing with bevel gear pinion 139 keyed to shaft 140 of a pair of shafts, the other of which is 141 and which are mounted in ball bearings 142, 143 and 144, 145, as shown.

The shafts 140 and 141 have keyed thereto meshing spur gears 146 and 147, respectively, and at their outer ends may be mounted the rollers 148 and 149 constituting the pair of weldrod feed rollers Y, each resiliently or yieldingly faced in the same manner as the pair X, but with their axes at right angles to the axes of the rollers constituting the pair X.

The rollers 125 and 126 constituting the pair X and the rollers 148 and 149 constituting the pair Y are each removably secured by suitable nuts or the like to their respective shafts so that when longitudinal seams are being made the rollers 148 and 149 may be readily removed and when circumferential seams are being made the rollers 125 and 126 may be readily removed.

The weldrod Z shown in Figs. 14 and 15 is of the covered type and has formed thereon spaced bumps 300 which extend through the covering and are adapted to be engaged by contact shoes in the casing 301 for conducting welding current to the rod. It will be observed that I have shown in Fig. 14 the bumps 300 as being at right angles to a plane normal to the axes of the rollers Y, the reason being to prevent engagement under pressure of the hard metal bumps with the rubber forming the surface of the rollers, which engagement might cause undue wear of the latter.

The casing 301 is suspended from the head by means of a swivel joint 302 so that the casing may be turned about the axis of the weldrod to provide for the just described desirable arrangement of the weldrod and roller in welding both longitudinal and circumferential seams. The nut 303 serves to secure the casing 301 in either position.

From the foregoing it will be apparent that regardless of the angular position of the weldrod due to the movement of handwheels 65 or 111, or the change in horizontal position of the weldrod feeding head due to movement of the handwheel 83, the feeding mechanism of the weldrod will not be thrown out of action.

The welding machine previously described is used in connection with the circuit and controls indicated in Fig. 2 wherein the work is indicated at 150 and the weldrod at 151, the bumps or bare contact faces 300 of which are engaged by the diagrammatically represented current carrying shoes 154. The weldrod 151 is, as previously described, moved to or from the work 150 by the reversible motor 114.

A jet of inert or reducing gas may be fed through the nozzle 155 from the supply pipe 158, controlled by either or both the solenoid operated valve 157 and the manually operable valve 156 to the vicinity of the arc between the weldrod 151 and the work 150.

The arc circuit includes a power supply which is preferably alternating current at a suitable voltage, for example 220 volts, which supply is connected to the primary of a welding transformer 159 and adjustable reactor 160 described in a separate application. One side of the secondary of the transformer and reactor is connected by a lead 161 to one pole 162 of a magnetically operated switch D, the other pole 164 of which is connected to the current carrying shoes 154 engaging the weldrod 151. The other side of the transformer is connected by a lead 165 to the work 150; thus when the switch D is closed an arc may be struck and held between the end of the weldrod 151 and the work 150.

After the arc is started, it may be controlled by regulating the rate of feed of the weldrod 151 through control of the speed of the reversible weldrod feed motor 114.

In order to effect control of the reversible weldrod feed motor 114, in the form of the invention which is illustrated, a direct current supply line at a suitable voltage, for example 60 volts, is provided. As shown, the direct current supply line includes leads 166 and 167; and, as will presently appear, through the medium of control apparatus energized by this supply line and control apparatus actuated by the changing characteristics of the arc, there is obtained an automatic regulation of the arc.

With the circuit shown, the operator adjusts the weldrod 151 to the work 150 and closes the "start-stop" switch, thereby establishing connection between the contacts 168 and 169 thereof, and as a result current will flow from the lead 167, through the contacts 168 and 169, the solenoid which operates the switch A, thence back to the other side 166 of the supply line. Switch A will then close and current will flow therethrough from the side 167 of the supply line, through the solenoid which operates the switch C, and thence back to the other side 166 of the supply line. When switch C closes, current will flow from the lead 167 through the contacts of the switch C and through the solenoid which operates the switch D and then back to the lead 166. When switch D closes, the arc circuit from the transformer 159 will flow through the contacts 162 and 164 and permit the initiation of an arc between the weldrod 151 and the work 150 by means of momentarily placing across the gap a carbon pencil or the like.

The closing of the switch D also permits current to flow through the solenoid which operates an arc control relay switch F, having a core or plunger 163 which operates two sets of contacts 170, 171 and 172, 173 respectively. When the solenoid of switch F is energized, the core 163 thereof will be moved upward to establish first connection between contacts 170, 171 and after this connection is made, further movement of the core will break the connection between contacts 172, 173. The core of the switch F is urged downward by a suitable spring 174 or the like. The closing of the contact 170, 171 of the arc control relay switch F, causes current to flow from the conductor 167 through the solenoid for operating the switch B and back to the conductor 166, thereby operating the switch to close contacts 200, 201 and 202, 203 and permitting current to flow through the motor 114 in a direction to feed the weldrod 151 toward the work 150, the field of the motor having been previously energized by the closing of the switch A.

The solenoid for operating a switch E is in a circuit arranged in parallel with the circuit which includes switch F. The solenoid of switch E when energized, acts in a direction to open contacts 208 and 209 of switch E and a spring 207 acts against the force of the solenoid to close the switch. The solenoid is designed to overcome the force of the spring 207 when the voltage flowing therethrough exceeds a predetermined amount, for example 50 volts. A resistor 176 of predetermined characteristics, for example, 20 ohms is arranged in shunt relation with contacts 208 and 209 of switch E, and both are in series with the circuit which includes the solenoid of switch F, the purpose of such arrangement being to provide for the protection of the solenoid of switch F before the arc is struck or in case the voltage becomes excessively high due to a long arc or failure of the arc. With the striking of the arc, the voltage will drop and spring 207 will close switch E, thereby shunting the resistor 176.

With the foregoing arrangement, should the arc lengthen, thereby causing an increase in voltage through the solenoid of the arc control relay switch F such solenoid will move the relay plunger 163 upward to a point where contacts 172 and 173 are broken, but not sufficient to break contacts 170, 171 and as a result current will flow through a shunt circuit including a manually adjustable rheostat 177 arranged in series with the field of the motor 114. This action will cause the weldrod feed motor to increase its speed, and thereby move the end of the weldrod 151 nearer the work 150 at an increased rate over the normal rate of consumption, thus shortening the arc length and reducing the voltage through the solenoid of switch F, which causes the relay plunger 163 to be moved downward by the spring 174 sufficient to re-establish connections between contacts 172 and 173, and shunt out the rheostat 177, but insufficient to break the connection between contacts 170 and 171. The weldrod motor will then operate at its former speed to feed the weldrod toward the work. The speed at which the motor 114 operates when the connection between contacts 172 and 173 is broken, depends upon the previously selected adjustment of the rheostat 177. Also, an arc length control rheostat 178 which is in series with the solenoid of switch F, is adjustable to absorb more or less of the arc voltage so as to alter the critical arc voltage at which solenoid of switch F breaks the connection between contacts 172 and 173. Therefore, the rheostat 178 functions to determine the arc length at which stable operation is maintained.

Should the weldrod freeze to the work 150, the resistance to flow set up by the gap, of course, drops to zero, thereby short circuiting the solenoid of the arc control relay switch F. As a result spring 174 will open contacts 170, 171 and thereby de-energize the solenoid of switch B. A spring 210 will break the connection between contacts 200, 201 and 202, 203, and establish connection between contacts 201, 204 and 203, 205, thereby causing the current to flow through the armature of the motor 114 in the reverse direction and cause the motor to operate to move the weldrod away from the work to re-establish the arc. As the contacts 172, 173 are in engagement, the motor will operate in the reverse direction at the slow speed, thereby facilitating the reestablishing of the arc. When the arc is re-established, current will then flow through the solenoid of switch F and cause contacts 170 and 171 to be re-engaged, and thereby energize the solenoid of switch B, and cause the latter to again close contacts 200, 201 and contacts 202, 203, and cause the current to flow through the motor in a direction to move the weldrod toward the work.

In connection with this circuit it is to be noted that during welding, the contacts 170, 171 of the arc control relay switch F are closed at all time except when the resistance to current flow set up by the gap is dropped to near zero or to zero by, for instance, the short circuit condition just described. However, the right hand contacts 172, 173 of the switch F open and close according to slight adjustment of the relay plunger responding to variations in the voltage due to variations of arc length. It will thus be evident that the contacts 172, 173 of the arc control relay switch F place the weldrod field rheostat 177 in and out of the circuit of the field of the motor 114, and with this arrangement the weldrod feed motor is caused to operate at a predetermined fast rate, or a predetermined slow rate according to whether the contacts 172, 173 are open or closed.

The predetermined fast rate of the weldrod feeding motor 114 must be such that the weldrod or electrode is fed to the work at a rate faster than it is consumed by the arc as otherwise the operation of the arc would be unstable; but the predetermined slow rate is preferably slower than the rate of consumption of the weldrod by the arc, as otherwise the arc will continue to shorten, thereby causing the plunger of the arc control relay switch F to drop, opening the contacts 172, 173, and de-energizing the coil of switch B which would cause the weldrod feeding motor 114 to reverse.

While I have shown one preferred embodiment of my invention it will be obvious to those skilled in the art that it is not so limited, but is susceptible of various changes and modifications, without departing from the spirit thereof, and I desire, therefore, that only such limitations shall be placed thereupon as are imposed by the prior art or as are specifically set forth in the appended claims.

I claim—

1. In an arc welding system, a movable work piece and a consumable weldrod included in an arc circuit, electrically energized means for normally imparting continuously uni-directional feeding movement to the weldrod forwardly toward the work, independently of the movement of the work, either at a rate faster or slower than a predetermined rate of weldrod consumption, and means responsive to arc voltage for normally continuously energizing the weldrod moving means selectively for faster or slower feeding accordingly as the arc length increases and decreases.

2. In an arc welding system, a relatively movable work piece and a consumable weldrod included in an arc circuit, a two-speed electrically driven weldrod feeding means arranged to continuously move the weldrod toward the work at a fixed predetermined uniform rate, one greater and the other less than the actual rate of weldrod consumption, means included in the arc circuit responsive to the energy of the arm for selecting the greater rate on lengthening of the arc and the lesser rate on shortening of the arc length from a predetermined arc distance, and means responsive to arc energy for reversing the direction of weldrod travel only upon contact of weldrod and work piece.

JAMES E. TRAINER.